United States Patent [19]
Klinck et al.

[11] Patent Number: 5,793,022
[45] Date of Patent: Aug. 11, 1998

[54] ADAPTIVE TEMPERTURE CONTROLLER AND METHOD OF OPERATION

[75] Inventors: Kimberly E. Klinck, Cupertino; Brian M. Cooper, Santa Clara; Harold J. Mellen, III, Sunnyvale, all of Calif.

[73] Assignee: Applied Materials, Inc., Santa Clara, Calif.

[21] Appl. No.: 710,158

[22] Filed: Sep. 12, 1996

[51] Int. Cl.$^6$ .................................................. H05B 1/02
[52] U.S. Cl. ................ 219/483; 219/121.43; 219/494; 219/501; 219/497; 437/247
[58] Field of Search ........................... 219/505, 501, 219/506, 497, 494, 442, 443; 156/345; 236/78 D; 437/247, 248

[56] References Cited

U.S. PATENT DOCUMENTS

| | | | |
|---|---|---|---|
| 4,296,312 | 10/1981 | Salem | 219/501 |
| 4,307,689 | 12/1981 | Raeske et al. | 123/179 H |
| 4,404,462 | 9/1983 | Murray | 219/497 |
| 4,607,153 | 8/1986 | Ang et al. | 219/497 |
| 4,901,918 | 2/1990 | Grald et al. | 236/178 D |

Primary Examiner—Mark H. Paschall

[57] ABSTRACT

An adaptive controller for controlling the temperature of a body. The adaptive controller of the present invention comprises a temperature measuring device which measures the temperature of the body. A controller which has a controller integral time constant and a controller gain constant is provided for controlling a heating device. An adjustment mechanism is provided which determines the controller integral time constant and the controller gain constant where the controller integral time constant and the controller gain constant are dependent upon the difference between the present temperature of the body and the desired temperature of the body.

13 Claims, 8 Drawing Sheets ial
ADAPTIVE TEMPERTURE CONTROLLER AND METHOD OF OPERATION

BACKGROUND OF THE INVENTION

1. Field of the Invention

The present invention relates to the field of temperature controllers and more specifically, to an adaptive temperature controller used to control the temperature of a wafer in a reactor.

2. Discussion of Related Art

During the manufacture of semiconductor devices, thin films are often formed on a semiconductor wafer surface. A typical processing apparatus 110 is illustrated in FIG. 1. Processing apparatus 110 will typically include a susceptor 102, located within a chamber 119, on which a wafer or substrate 104 to be processed is placed. The top 106 and bottom 108 of the reaction chamber 119 are generally formed of quartz to allow light of the visible and IR frequency from lamps 126 to pass into chamber 119 and heat susceptor 102 and wafer 104. A temperature measuring device, such as a pyrometer 114, is provided to measure the temperature of wafer 104. Because reactions which occur in chamber 119 are extremely temperature dependent, an important component of processing apparatus 110 is its temperature control apparatus.

The function of the temperature control apparatus is to "ramp" the temperature of a wafer from an initial temperature (present temperature $T_p$) to a desired temperature for processing (temperature set point $T_{SP}$) and to accurately obtain and maintain the temperature set point throughout processing.

A temperature control apparatus typically comprises a heating element such as lamps 126, temperature measuring device such as a pyrometer 114, power controller 116, and a computer or other processing means 118. Computer 118 receives the wafer's current temperature value from pyrometer 114 and compares the temperature set point ($T_{SP}$) with wafers current temperature ($T_P$). If there is an error (i.e. $T_{SP} - T_P \neq 0$) then the temperature control apparatus works to the set point according to a temperature control algorithm. The temperature control algorithm provides signals to power controller 116 to increase or decrease the power provided to lamps 126 in order to increase, decrease, or maintain the temperature of wafer 104. The algorithm generally used in apparatus 110 to determine the power to be supplied to lamps 112 is a well known proportional integral derivative (PID) algorithm set forth below:

$$P(T_P) = \kappa_i \epsilon(T_P) + \frac{\kappa_i}{\tau_i} + \int \epsilon(T_P) dt$$

where $T_p$=Present temperature;
$\epsilon$=Temperature Set Point ($T_{SP}$)—Present Temperature ($T_p$);
$\tau_i$=Controller integral time constant;
$\kappa_i$=Controller gain constant.

The controller integral time constant ($\tau_i$) and the controller gain constant ($\kappa_i$), are constants whose values are determined experimentally with well known techniques. The accuracy, speed, and stability of any control system is determined by controller parameters. A problem with temperature control apparatus 120 is that the controller integral time constant ($\tau_i$) and the controller gain constant ($\kappa_i$) are not constant. The controller integral time constant ($\tau_i$) and the controller gain constant ($\kappa_i$) are a function of both the temperature set point ($T_{SP}$) and the error ($\epsilon$). That is, the value of the controller integral time constant ($\tau_i$) and the controller gain constant ($\kappa_i$) depends on where the process is (present temperature $T_p$) and where it is going (temperature set point $T_{SP}$). Because the controller gain ($\kappa_i$) and controller integral time constant ($\tau_i$) are always the same value (i.e. held constant), no matter what the present temperature or the temperature set point is, the ability of the controller to track the temperature set point ($T_{SP}$) and to reject disturbances (e.g. random oscillations in power) is hindered.

Because the current controller holds constant the controller gain constant ($\kappa_i$) and controller integral time constant ($\tau_i$) when they actually should vary depending on the error ($\epsilon$) and temperature set point ($T_{SP}$) process results are detrimentally affected. For example, with the current control system, wafer throughput is substantially reduced because it takes the controller longer to "ramp" the temperature of the wafer from an initial temperature (e.g. room temperature) to a temperature at which the process is to occur (i.e. temperature set point $T_{SP}$). Additionally, inaccuracies and inconsistencies in obtaining and maintaining the temperature set point ($T_{SP}$) can cause deposited films to vary in thickness and doping uniformity which can lead to yield loss, device performance degradation, and reliability problems. The shortcomings of current temperature control methodologies and apparatus is expected to be compounded as wafer sizes increase to 300 mm and beyond.

Thus, what is needed is a new temperature control apparatus and method which can adapt to present conditions to obtain a faster and more reliable temperature control.

SUMMARY OF THE INVENTION

An adaptive temperature controller for controlling the temperature of a body is described. The adaptive controller of the present invention comprises a temperature measuring device which measures the temperature of the body. A controller which has a controller integral time constant and a controller gain constant is provided for controlling a heating device. An adjustment mechanism is provided which determines the controller integral time constant and the controller gain constant where the controller integral time constant and the controller gain constant are dependent upon the difference between the present temperature of the body and the desired temperature of the body and upon the desired temperature of the body.

DETAILED DESCRIPTION OF THE PRESENT INVENTION

The present invention describes a novel method and apparatus for controlling the temperature of a body in a manufacturing process. In the following description, numerous specific details are set forth, such as specific semiconductor equipment configurations and control algorithms, in order to provide a thorough understanding of the present invention. It will be obvious, however, to one skilled in the art, that the present invention may be practiced without these specific details. In other instances, well known semiconductor process procedures and control theories have not been described in particular detail in order to not unnecessarily obscure the present invention.

The present invention is a novel adaptive controller used to control the temperature of a body, such as a substrate or wafer, in a semiconductor processing apparatus. The controller is said to be adaptive because the controller includes an adjustment mechanism which recalculates or alters the controller gain constant and controller integral time constant throughout a temperature ramp and/or process. The values of the controller gain constant and controller integral time constant are constantly recalculated based on the present temperature of the body and the desired (temperature set point) of the body. In this way, the controller is better able to respond to a change in the temperature set point and to reject disturbances. The adaptive controller of the present invention can dramatically improve wafer throughput by decreasing the time it takes to ramp a wafer to a process temperature. Additionally, the adaptive controller of the present invention enables wafer temperature to be more accurately obtained and maintained resulting in better film quality, uniformity, and reliability.

Figure 1:
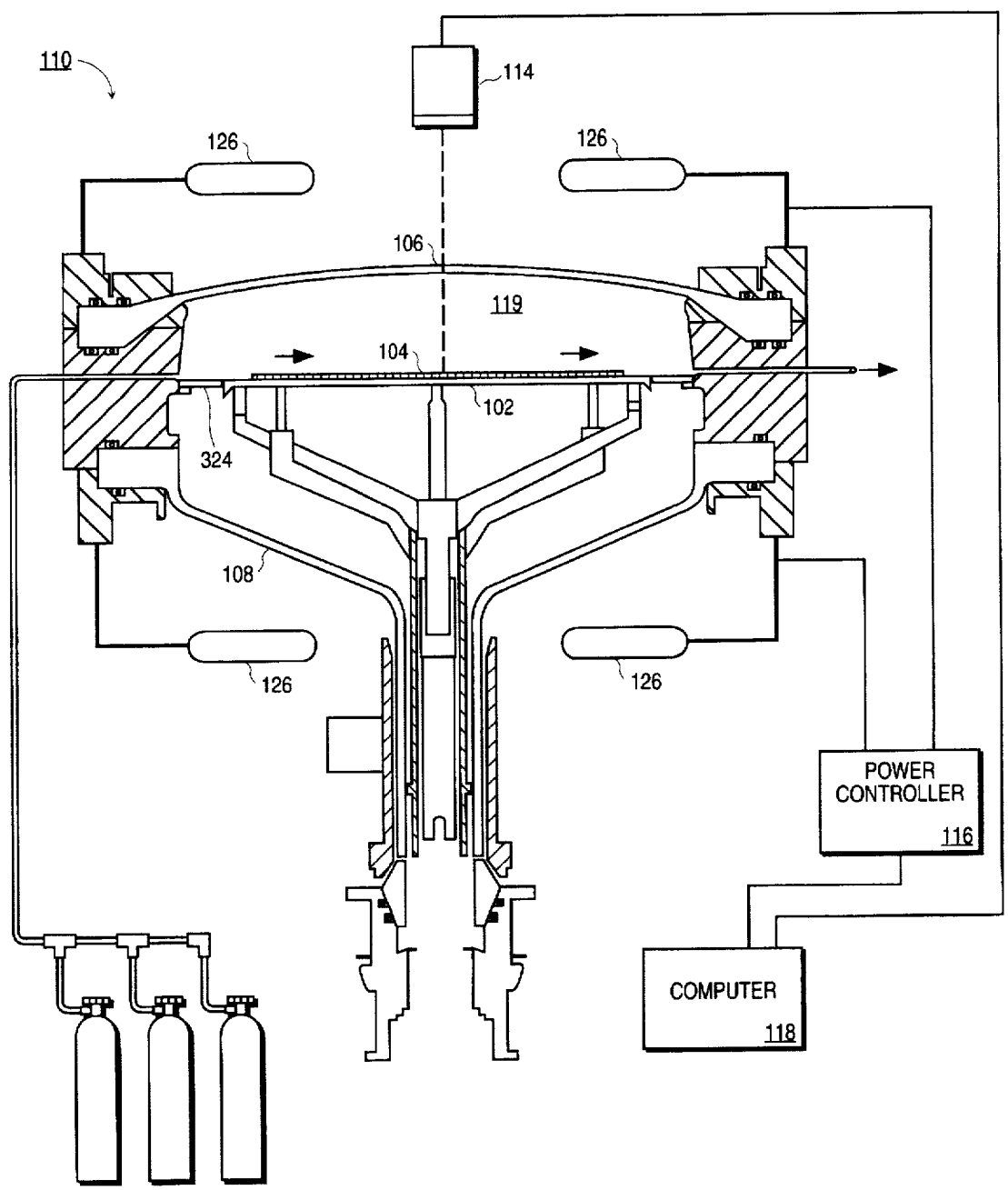
FIG. 1 is an illustration of a current semiconductor processing apparatus.
Figure 2:
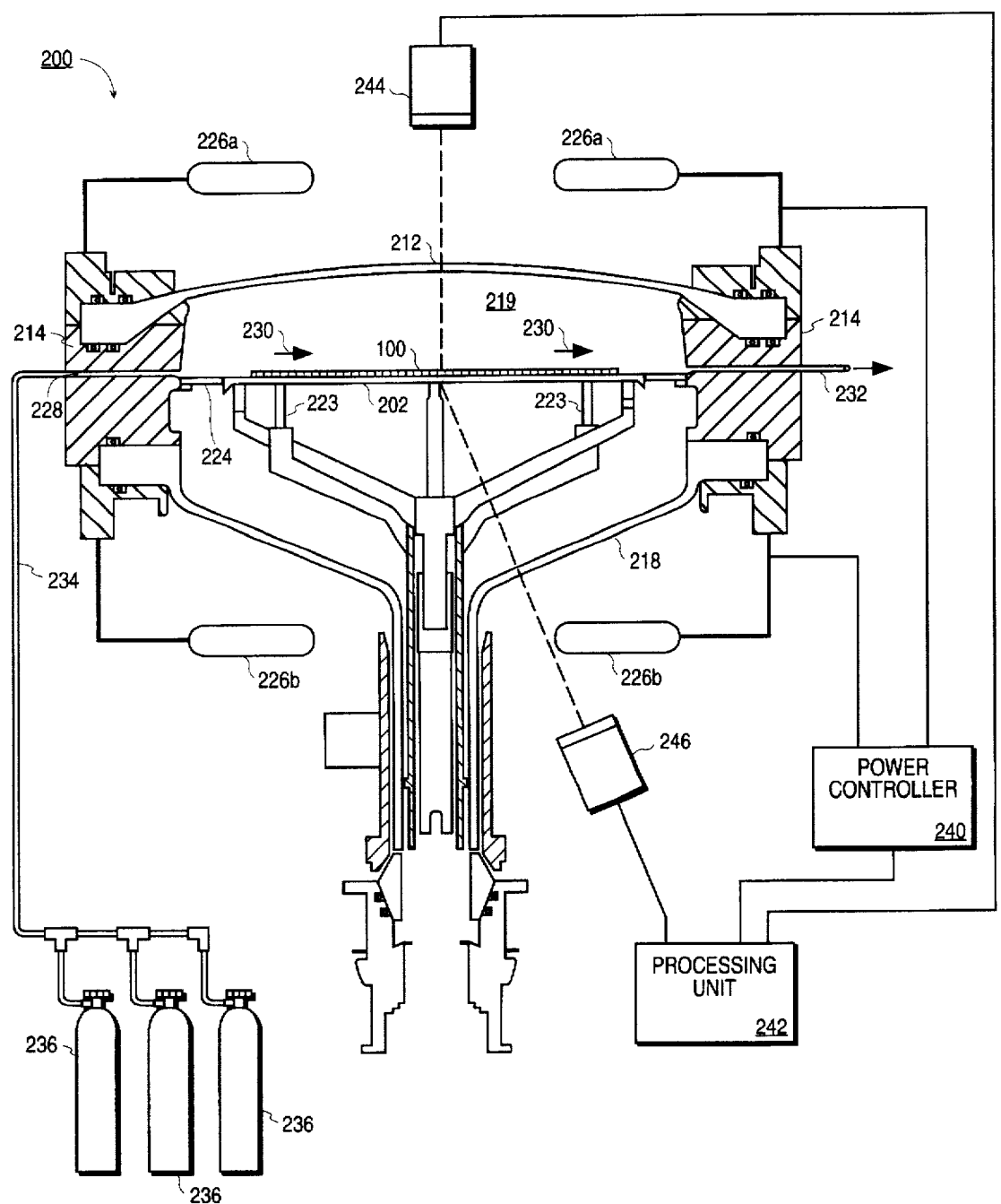
FIG. 2 is an illustration of a semiconductor process apparatus of the present invention.

The present invention is ideally suited for use in a single wafer reactor, such as shown in FIG. 2, where the temperature of a wafer must be accurately controlled in order to ensure suitable results. Although the present invention will be described with respect to the single wafer chemical vapor deposition reactor, shown in FIG. 2, it will be appreciated that the present invention is equally applicable to other semiconductor processing equipment, such as etchers, sputterers, and ion implanters and in fact is useful in any system where fast, accurate, and stable control of the temperature of a body is required.

An example of a single wafer chemical vapor deposition apparatus incorporating the adaptive controller of the present invention is illustrated in FIG. 2. The single substrate reactor 200, shown in FIG. 2, has a top 212, sidewalls 214, and a bottom 218 that define a chamber 219 into which a single wafer or substrate 100 can be loaded. A substrate or wafer 100 is mounted on a pedestal or susceptor 202 that is rotated by a motor (not shown) to provide a time average environment for the substrate 100 that is cylindrically symmetric. A susceptor circumscribing preheat ring 224 is supported by sidewalls 214 and surrounds susceptor 202 and substrate 100. Lifting fingers 223 pass through holes (not shown) formed through susceptor 202 to engage the underside of substrate 100 to lift it off susceptor 202. Substrate 100 and preheat ring 224 are heated by a heat source, such as but not limited to a plurality of high intensity lamps 226 mounted outside reactor 200. High intensity lamps 226 are preferably tungsten halogen lamps which produce infrared (IR) light at a wavelength of approximately 1.1 microns.

The top 212 and the bottom 218 of reactor 200 are substantially transparent to light to enable light from external lamps 226 to enter chamber 219 and heat susceptor 202, substrate 100, and preheat ring 224. Quartz is used for the top 212 and the bottom 218 because it is transparent to light at a visible and IR frequency; because it is relatively high strength material that can support a large pressure difference across it; and because it has a low rate of outgassing.

Chamber 219 is evacuated through exhaust port 232 by a pump (not shown) to reduce the pressure in chamber 219 from atmospheric pressure to a deposition pressure. During deposition, a reactant gas stream flows from a gas input port 228 across a preheat ring 224 where the gases are heated, across the surface of substrate 100 in the direction of the arrows 230 to deposit films thereon and out through exhaust port 232. The gas input port 228 is connected via a conduit 234 to a gas supply represented by tanks 236 that provides one of a mixture of gases. The gas concentration and/or flow rate through conduit 234 and each of the ports 228 and 232 are selected to produce processing gas flows in concentration profiles that optimize processing uniformity. The dominant shape of the profile is laminar flow from gas input port 228 and across the preheat ring 224 and the substrate 100 to exhaust port 232.

Semiconductor processing apparatus 200 has a temperature control apparatus which includes a heat source 226, a power controller 240, a processing unit 242, and a temperature measuring device 244. Additional temperature measuring devices, such as a temperature measuring device 246 for measuring the temperature of susceptor 202, may be included in the temperature control apparatus, if desired.

Heat source 226 preferably comprises a plurality of lamps divided into a top plurality of lamps 226a arranged in a circular array and a bottom plurality of lamps 226b, also arranged in a circular array. Lamps 226 emit radiation at a frequency at which the body to be heated absorbs radiation. In the presently preferred embodiment of the present invention, the body to be heated is a silicon wafer. Top lamps 226a are positioned to generally heat substrate 100 and a portion of the top of susceptor and top of preheat ring to 202 and bottom lamps 226b are arranged to generally heat the bottom of susceptor 202 and the bottom of preheat ring 224. It is to be appreciated that heat source 226 need not necessarily be a lamp or a plurality of lamps but can be other sources of heat such as but not limited to resistance heaters or rf induction heaters.

Power is provided to lamps 226 from a power controller 240. Power controller 240 can preferably independently control the power applied to the top array of lamps 226a and the bottom array of lamps 226b and to subarrays of each, if desired. That is, power controller 240 can preferably provide different percentages of the total power supplied to lamps 226 to the top and bottom arrays of lamps 226a and 226b, and subarrays of each, if desired.

A processing unit 242, such as a computer, is coupled to power controller 240 and outputs signals to power controller 240 detailing how much power to supply to lamps 226. Additionally, processing unit 242 is coupled to and receives input signals from temperature measuring device 244 indicating the present temperature of wafer 100. Temperature measuring device 244 is preferably a pyrometer which located outside of reaction chamber 219 and which measures radiation at the emission frequency of wafer 100. It is to be appreciated that any suitable contact (e.g. thermocouple) or noncontact (e.g. pyrometer) temperature measuring device can be used as temperature measuring device 244.

Processing unit 242 is preferably a computer having a central processor (CPU), a volatile and a non-volatile memory, such as DRAMS and ROMS, and input and output devices, such as a keyboard and a display terminal. An adaptive temperature control algorithm in the form of executable code is stored in non-volatile memory for execution by the central processor of processing unit 242. The adaptive temperature control algorithm of the present invention manages and controls the temperature control apparatus of semiconductor processing apparatus 200. It is to be appreciated that processing unit 242 need not necessarily be a computer comprising a processor and memory, and can be other suitable devices such as, but not limited to, hardwired logic, programmable logic devices, and neural networks. Any device which is capable of receiving temperature inputs, executing specified steps, and providing power output signals can be utilized as processing unit 242.

Figure 3:
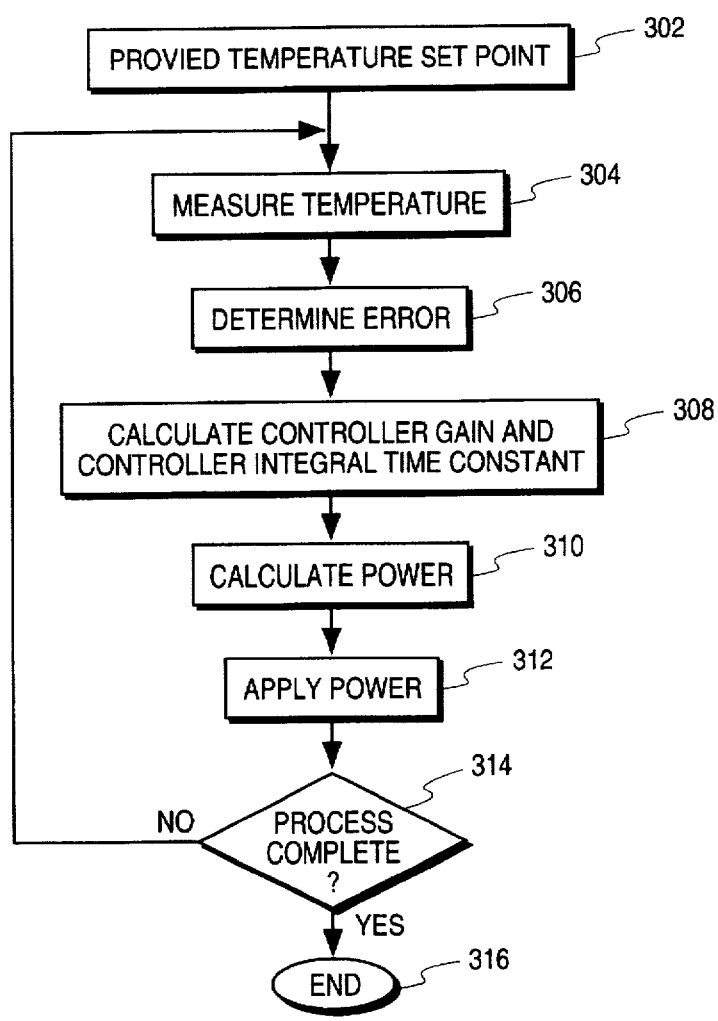
FIG. 3 is a flow chart which illustrates the adaptive temperature control algorithm of the present invention.

A flow chart 300, which illustrates the adaptive temperature control algorithm of the present invention, is shown in FIG. 3. The first step, as specified in block 302, is to specify a temperature set point ($T_{SP}$). The temperature set point ($T_{SP}$) is the temperature desired of the wafer in order to carry out a particular process, such as a silicon film deposition. The temperature set point ($T_{SP}$) is chosen and entered into processing unit 242.

Next, as specified in block 304, processing unit 242 receives a measurement value from pyrometer 244 which represents the present temperature ($T_P$) of wafer 100.

Next, as specified in block 306, the difference between the temperature set point ($T_{SP}$) and the present temperature ($T_P$) is calculated. The difference between the temperature set point ($T_{SP}$) and the present temperature ($T_P$) is defined as the error ($\epsilon$). That is, $\epsilon = T_{SP} - T_P$.

Next, as specified in block 308, the controller integral time constant ($\tau_i$) and the controller gain constant ($\kappa_i$) are determined. According to the present invention, the value of the controller gain constant ($\kappa_i$) and the controller integral time constant ($\tau_i$) are dependent upon the error ($\epsilon$) and the temperature set point ($T_{SP}$). That is, the controller gain constant ($\kappa_i$) and the controller integral time constant ($\tau_i$) are calculated from equations which depend upon the error ($\epsilon$) and the temperature set point ($T_{SP}$). In this way, the controller gain constant ($\kappa_i$) and the controller integral time constant ($\tau_i$) better fit or reflect the position of the process when the temperature sample is taken. A preferred method of determining the dependency of the controller gain constant ($\kappa_i$) and the controller integral time constant ($\tau_i$) on the temperature set point ($T_{SP}$) and the error ($\epsilon$) will be explained later.

Next, as specified in block 310, the power to be supplied to lamp 226 is calculated. The values of the controller integral time constant ($\tau_i$) the controller gain constant ($\kappa_i$) calculated in block 308 are utilized to determine the amount of power to supply to lamps 226. According to the preferred embodiment of the present invention, the power is calculated utilizing a proportional integral derivative (PID) algorithm with the derivative portion set to zero. A PID algorithm which can be used in the present invention is set forth below:

$$P(T_P) = \kappa_i \epsilon(T_P) + \frac{\kappa_i}{\tau_i} + \int \epsilon(T_P) dt \qquad \text{(Eq. 1)}$$

where $T_P$=Present temperature;

$\epsilon$=Temperature set point ($T_{SP}$)—present temperature ($T_P$);

$\tau_i$=Controller integral time constant;

$\kappa_i$=Controller gain constant.

As is evident from the PID equation above, the amount of power to be applied to lamps 226 is dependent upon the controller gain constant ($\kappa_i$) and the controller integral time constant ($\tau_i$).

Next, as specified in blocks 312, the power calculated in block 310 is applied to lamps 226. The lamps, in turn, produce radiation at a frequency which heats wafer or substrate 100.

As specified in block 314, the steps of blocks 304, 306, 308, 310, and 312 are continually repeated until the wafer temperature is ramped up to the desired temperature set point ($T_{SP}$) at which time the specified process (e.g. film deposition or etching) is conducted. Additionally, steps of blocks 304-312 are continually repeated during the process (e.g. film deposition or etching) in order to accurately maintain the temperature of wafer 100 during processing. During the temperature ramp and process, the temperature control algorithm of the present invention preferably repeats steps of blocks 304-312 at least once every tenth of a second and ideally, at least once every millisecond.

Once the desired process has been completed (e.g. once desired film has been deposited, etched or implanted), the adaptive temperature control algorithm ends as set forth in block 316.

Figure 4:
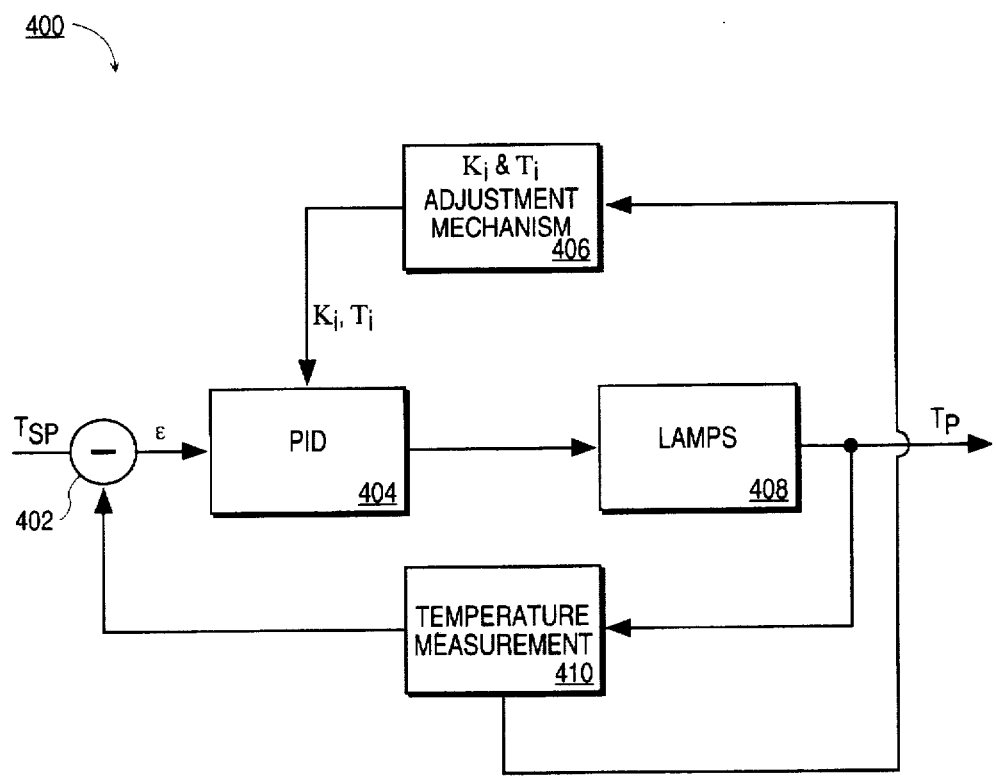
FIG. 4 is a block diagram of the adaptive temperature control apparatus of the present invention.

FIG. 4 is a functional block diagram 400 of the temperature control apparatus of the present invention. A temperature set point ($T_{SP}$) is fed into the controller. The temperature set point ($T_{SP}$) is the temperature desired of the wafer to be heated. A comparator 402, compares the temperature set point ($T_{SP}$) with the present temperature ($T_P$) of the wafer provided by temperature measurement device 410 and calculates the error ($\epsilon$). The comparator 402 then sends the error ($\epsilon$) to a PID algorithm 404. The present temperature ($T_P$) of the wafer is also sent from temperature measurement device 410 to an adjustment mechanism 406 which calculates a controller integral time constant ($\tau_i$) and a controller gain constant($\kappa_i$) based on the temperature set point ($T_{SP}$) and the error ($\epsilon$) (i.e., the difference between the present temperature ($T_P$) of the wafer and the desired temperature of the wafer). Adjustment mechanism 406 provides the calculated controller time constant ($\tau_i$) and the calculated controller gain constants ($\kappa_i$) to the PID algorithm 404. The PID algorithm 404 then calculates the power to be applied to lamps 408 based on the error ($\epsilon$), the temperature set point ($T_{SP}$) the calculated controller gain constants ($\kappa_i$), and the calculated controller integral time constant ($\tau_i$). The calculated power is then applied to lamps 408 which in turn cause the heating of wafer 100.

Because the adaptive temperature control algorithm of the present invention continually recalculates and adjusts the controller integral time constant ($\tau_i$) and the controller gain constant ($\kappa_i$), the temperature control apparatus is optimized for present conditions. That is, the controller integral time constant ($\tau_i$) and the controller gain constant ($\kappa_i$) are recalculated each time a temperature sample is taken so they better reflect the difference between the temperature set point ($T_{SP}$) and the present temperature ($T_P$). Continuously recalculating the controller integral time constant ($\tau_i$) the control gain constant ($\kappa_i$) improves the accuracy, speed, and stability of the temperature control apparatus over those control systems which utilize a set value for the controller integral time constant ($\tau_i$) and the controller gain constant ($\kappa_i$). Utilizing the adaptive temperature control algorithm of the present invention substantially decreases wafer ramp times (i.e. the time necessary to take a wafer from an initial room temperature to a processing temperature), which in turn dramatically improves wafer throughput. Additionally, using the adaptive temperature control algorithm of the present invention allows the temperature set point to be more accurately achieved and maintained which improves wafer to wafer process uniformity and reliability.

Figure 5:
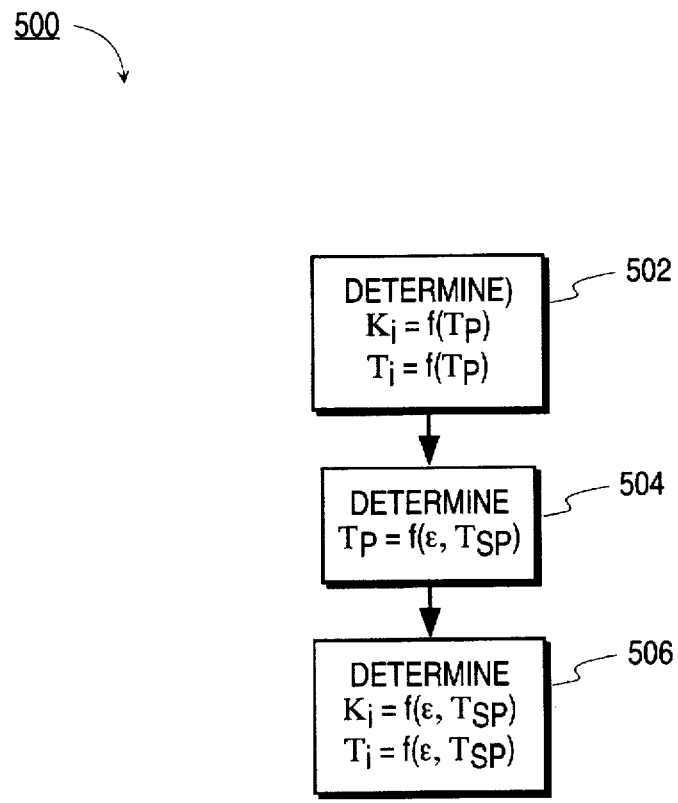
FIG. 5 is a flow chart detailing a method of determining the dependence of the controller integral time constant and the controller gain constant on error and temperature set point.

A preferred method of how to determine the controller gain constant ($\kappa_i$) as a function of error ($\epsilon$) and temperature set point ($T_{SP}$), and how to determine the controller integral time constant ($\tau_i$) as a function of error ($\epsilon$) and temperature set point ($T_{SP}$) is illustrated in flow chart 500 of FIG. 5.

The first step as specified, as specified in block 502, is to define the controller gain constant ($\kappa_i$) as a function of the process time constant ($\tau_P$) and the process gain constant ($\kappa_P$) and to define the controller integral time constant ($\tau_i$) as a function of the process time constant ($\tau_P$) and process gain ($\kappa_P$). The process time constant ($\tau_P$) is defined as the "characteristic time" for a process. It is the time when a process is 67% "complete". The process gain constant ($\kappa_P$) is defined as the change in output over the change in input. In reactor 200 the process gain ($\kappa_P$) is the change in temperature which results from a change in power $$\left( \text{i.e. } k_P = \frac{\Delta \text{Temp}}{\Delta P} \right).$$

Figure 6A:
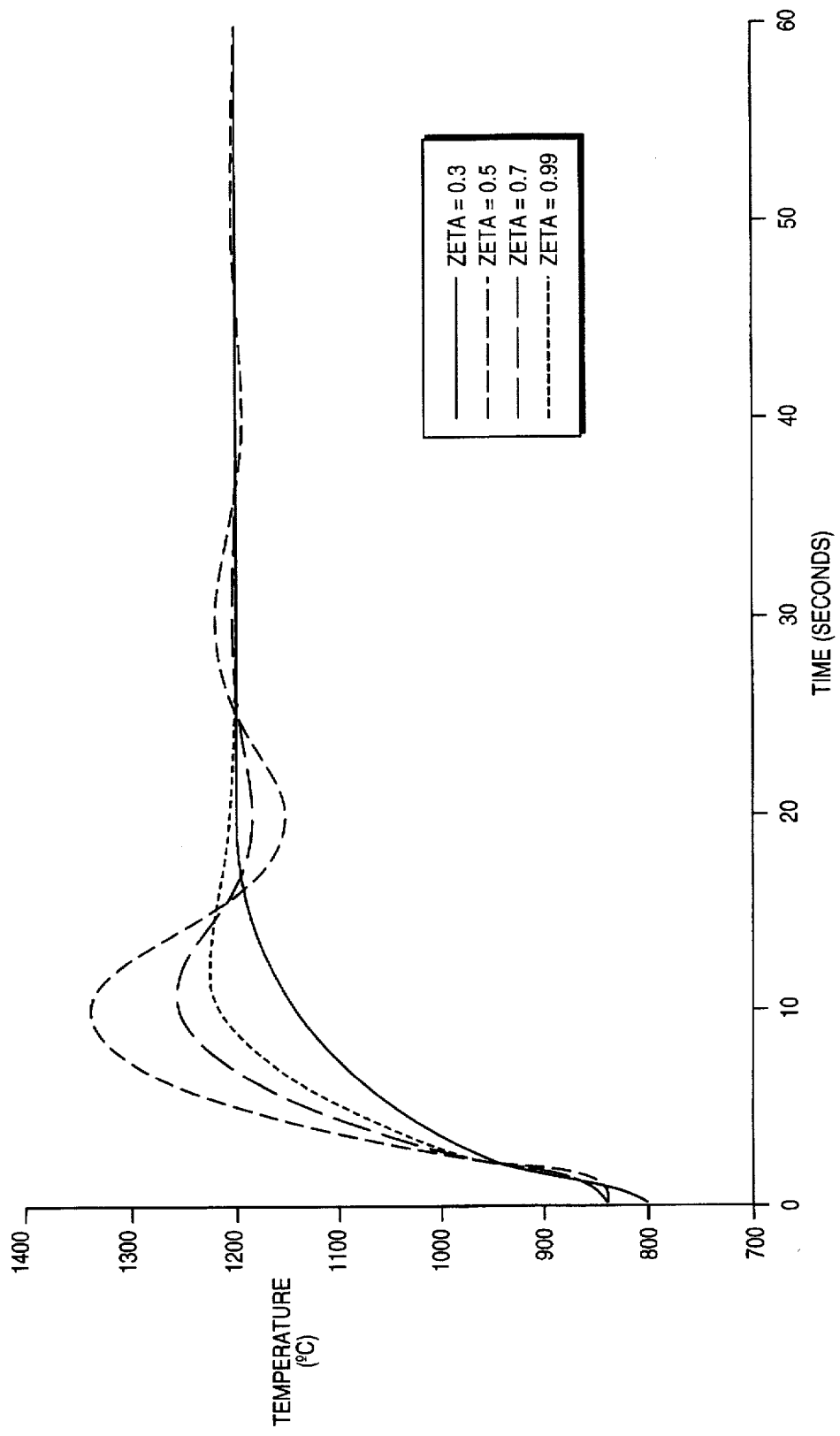
FIG. 6a illustrates simulations of various time responses.

From control theory a first order process coupled with a PI controller (PID controller with derivative set to zero) yields a theoretical second order process. A Laplace transform yields a characteristic equation of:

$$\tau^2 S^2 + 2\zeta\tau S + 1$$

where $\tau$=time constant and $\zeta$=damping factor. $\tau$ and $\zeta$ can then be solved for to yield:

$$\tau = \sqrt{\frac{\tau_i \tau_p}{\kappa_p \kappa_i}} \qquad \text{(Eq. 2)}$$

$$\zeta = \frac{1}{2} \cdot \frac{\tau}{\tau_p} \cdot (1 + \kappa_p \kappa_i) \qquad \text{(Eq. 3)}$$

where the valves $\tau$ and $\zeta$ are chosen to optimize the time response of the temperature control system. Typical values of $\tau$ and $\zeta$ can be entered into a first order time response equation such as shown below:

$$T(t) = 1 + \frac{e^{-\zeta t/\tau}}{\sqrt{1-\zeta^2}} \left[ \frac{\tau_i}{\tau} \sin\left( \sqrt{1-\zeta^2} \cdot \frac{t}{\tau} \right) - \sin\left( \sqrt{1-\zeta^2} \cdot \frac{t}{\tau} + \tan^{-1} \frac{\sqrt{1-\zeta^2}}{\zeta} \right) \right] \qquad \text{(Eq. 4)}$$

and a family of curves generated, as shown in FIG. 6a. From these curves optimized values of $\tau$ and $\zeta$ can be found. Good values of $\tau$ and $\zeta$ will exhibit a small amount of overshoot and reach set point quickly. Experimentation is used to optimize the values of $\tau$ and $\zeta$. For the simulations shown in FIG. 6a good values are $\tau$=3.0 and $\zeta$=0.7. Equation (2) and (3) can be solved for the controller integral time constant ($\tau_i$) and the controller gain constant ($\kappa_i$) respectively, resulting in the following relationships:

$$\tau_i = \frac{(\kappa_i \tau^2 \kappa_P)}{\tau_P} \qquad \text{(Eq. 5)}$$

$$\kappa_i = \frac{\left( \left[ \frac{2\zeta \tau_P}{\tau} \right] - 1 \right)}{\kappa_P} \qquad \text{(Eq. 6)}$$

Next, as specified in block 504, the process time constant ($\tau_P$) is defined in terms of temperature set point ($T_{SP}$) and error ($\epsilon$). The dependency of the process time constant ($\tau_P$) on temperature set point ($T_{SP}$) and error ($\epsilon$) can be determined using data from a plurality of "step tests". It is to be appreciated that other methods, such as but not limited to fourier analysis of impulse responses, may be used if desired to determine the dependency of the process time constant ($\tau_P$) on temperature set point ($T_{SP}$) and error ($\epsilon$).

Figure 6B:
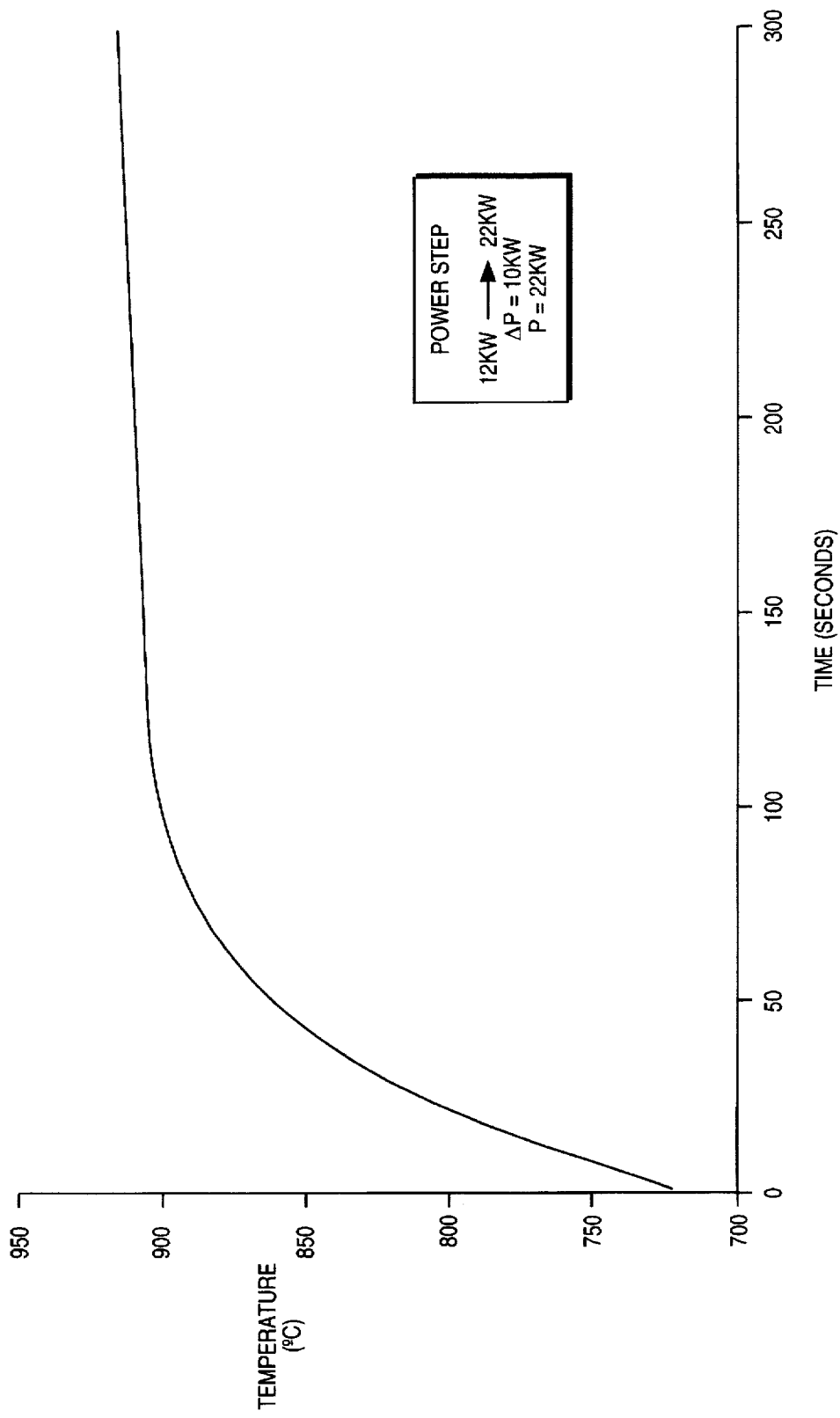
FIG. 6b is an illustration of a step test.

A step test involves applying a power step to a reactor presently at a steady state temperature, and recording the change in temperature through time due to the power step. An example of a power step test is illustrated in FIG. 6b. An initial total power (12 kilowatts) is applied to lamps 226 and maintained for a period of time (approximately five minutes) to allow wafer 100 to achieve a steady state temperature (approximately 725° C.). After steady state, a power step (10 kw; from 12 kw to 22 kw) is applied to lamps 226 and the change in wafer temperature is recorded over time until it once again achieves a steady state temperature (910° C.). The process time constant ($\tau_P$) is then calculated by assuming the process is first order (i.e. follows a function of the formula T=1-$e^{t/T}$; where T=temperature and t=time step). Many step tests are conducted by varying the power step ($\Delta P$) and the ending power (P). The average process time constant ($\tau_P$), the ending power (P) and the change in power ($\Delta P$) for each step test is recorded and entered into a statistics program, such as an Excel Statistic program, to determine the dependency of the process time constant ($\tau_P$) on the ending power (P) and the change in power $\Delta P$. An example of the process time constant ($\tau_P$) as a function of the ending power (P) and change of power ($\Delta P$) is shown below:

$$\tau_P = C1 \cdot P + C2 \cdot \Delta P + C3 \cdot P \cdot \Delta P + C4 \qquad \text{(Eq. 7)}$$

Figure 6C:
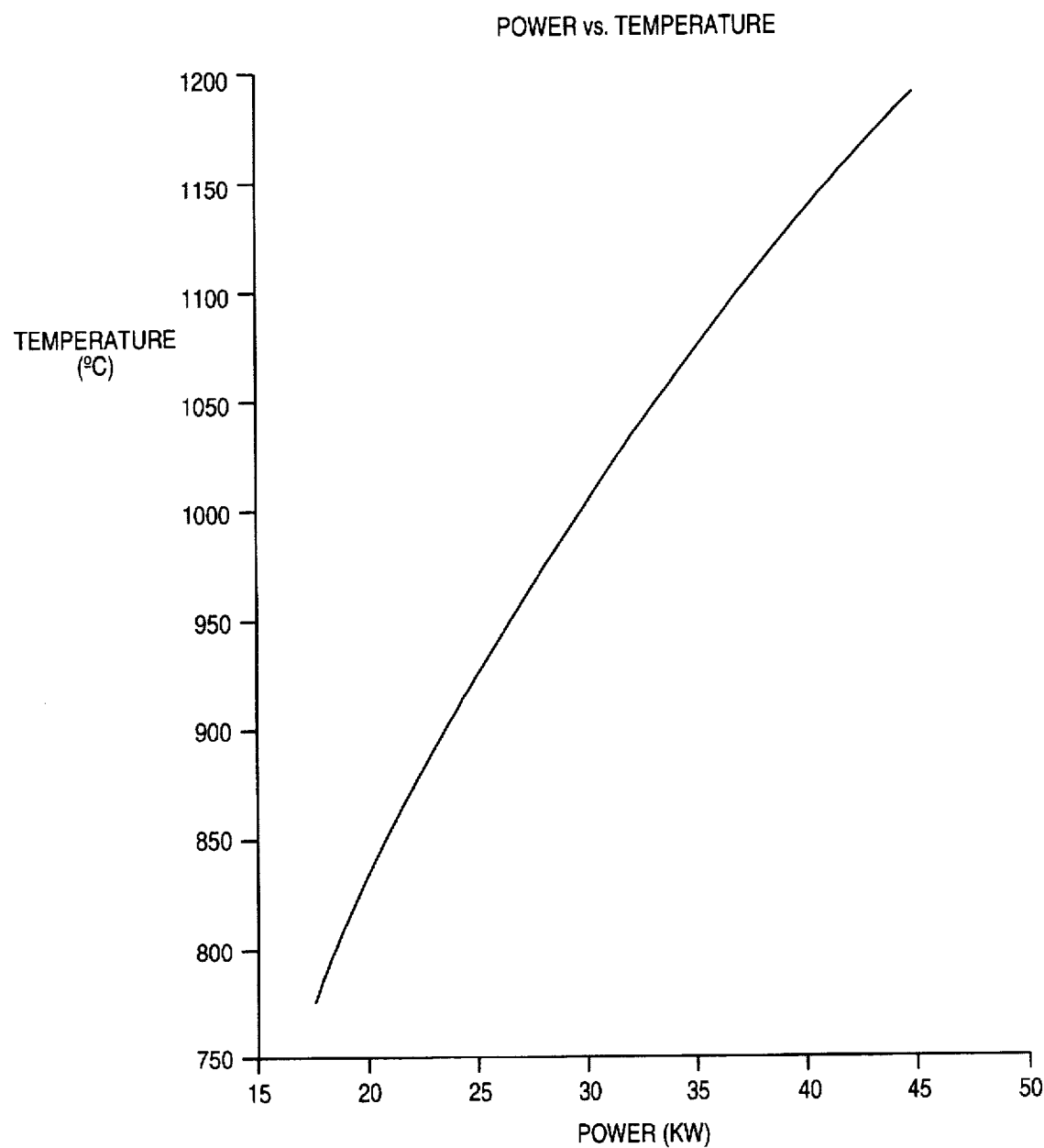
FIG. 6c is a Power vs. Temperature calibration curve.

Next, a simple Power vs. Temperature calibration curve is used to convert power to temperature thus giving the relationship for the process time constant ($\tau_P$) in terms of change in temperature ($\Delta T$) which is error ($\epsilon$) and ending temperature T, which is temperature set point ($T_{SP}$). An example of a Power vs. Temperature calibration curve is illustrated in FIG. 6c. A Power vs. Temperature calibration curve can be constructed by applying a total power to lamps 226 and recording the steady state temperature of wafer 100 that results. Several (at least 10) different amounts of total power are applied to lamps 226 to obtain a suitable Power vs. Temperature calibration curve.

Next, as illustrated in block 506, the controller integral time constant ($\tau_i$) and the controller gain constant ($\kappa_i$) are defined as functions of the error ($\epsilon$) and temperature set point ($T_{SP}$). That is, now that the process time constant ($\tau_P$) is represented as a function of error ($\epsilon$) and the temperature set point($T_{SP}$), one can substitute the equation for the process time constant ($\tau_P$) from step 504 into the equations for the controller gain constant ($\kappa_i$) (Eq. 6) and the controller integral time constant ($\tau_i$) (Eq. 5), from step 502, and thereby obtain the controller gain constant ($\kappa_i$) and the controller integral time constant ($\tau_i$) as a function of error ($\epsilon$) and temperature set point ($T_{SP}$). Additionally, the derivative of the Power vs. Temperature curve of FIG. 6c defines the process gain constant ($\kappa_P$). Because two equations (Eq. 5 & Eq. 6) with two unknowns are provided, the controller integral time constant ($\tau_i$) and the controller gain constant ($\kappa_i$) can be calculated with their values depending on error ($\epsilon$) and temperature set point ($T_{SP}$).

It is to be appreciated that although the method described above with respect to FIG. 5 is the preferred method of obtaining the controller gain constant ($\kappa_i$) and the controller integral time constant ($\tau_i$) as a function of error ($\epsilon$) and temperature set point ($T_{SP}$), other suitable methods may be utilized to define the relationship if desired.

It is to be appreciated that the present invention has been described and illustrated with respect to controlling the temperature of a wafer by measuring the wafer's temperature directly. At times it may be desirable to instead measure the susceptor's temperature and to infer the wafer's temperature from the susceptor's temperature. (At steady state the wafer and susceptor should have the same temperature.) In such a case, the methodology for determining the controller integral time constant ($\tau_i$) and the process gain process ($\kappa_i$) would be the same except the susceptor's temperature would be monitored as opposed to the wafer's. A temperature monitoring device 246 such as a pyrometer which can detect radiation at the emission frequency of the susceptor, which is typically silicon carbide, would be provided.

Additionally, at times it may be desirable to independently control the power applied to the top of array lamps 226a and the bottom array of lamps 226b in order to better control the temperature of wafer 100 and susceptor 202 during temperature ramping. (It is to be appreciated that since wafer 100 is typically of less thermal mass than susceptor 202, it generally heats at a faster rate than does susceptor 202). In such a case it may be desirable to calculate separate controller integral time constants ($\tau_i$) and controller gain constants ($\kappa_i$) for the susceptor and the wafer. In the this way both the temperature of the wafer and susceptor can be accurately controlled and maintained to achieve superior processing results.

Thus, an adaptive temperature controller which improves process throughput, uniformity, and reliability has been described.

We claim:

1. A method of controlling the temperature of a body in an apparatus, said method comprising the steps of:

setting a desired temperature for said body having a present temperature;

providing a controller integral time constant and a controller gain constant where said controller integral time constant and said controller gain constant depend upon said present temperature of said body and said desired temperature of said body; and utilizing said controller integral time constant and said controller gain constant to control the amount of heat provided to said body.

2. The method of claim 1 wherein the amount of heat provided to said body is controlled by controlling power supplied to a plurality of lamps.

3. The method of claim 2 wherein a proportional integral derivative algorithm is utilized along with said controller integral time constant and said controller gain constant to determine said amount of power to be applied to said heat source.

4. A method of controlling the temperature of a body in a semiconductor processing apparatus, said method comprising the steps of:

(a) providing a desired process temperature for said body;

(b) providing a first amount of power to a heat source wherein said first amount of power is dependent upon a first controller integral time constant and a first controller gain constant;

(c) measuring a current temperature of said body;

(d) determining the difference between said current temperature of said body and said desired process temperature of said body;

(e) determining a new controller integral time constant and a new controller gain constant wherein said new controller integral time constant and said new controller gain constant depend upon said desired process temperature of said body and said current temperature of said body;

(f) determining a new amount of power to be applied to said heat source based on said new controller integral time constant and said new controller gain constant; and (g) providing said new amount of power to said heat source.

5. The method of claim 4 wherein said new controller integral time constant is dependent upon said difference between said current temperature and said desired process temperature and upon said desired process temperature.

6. The method of claim 4 wherein said determining step of said new amount of power is determined utilizing a proportional integral derivative (PID) algorithm.

7. The method of claim 4 further comprising the steps of: repeating steps (c), (d), (e), (f), and (g) a plurality of times.

8. The method of claim 7 wherein said plurality steps are repeated at least once every 1/10 second.

9. An adaptive temperature controller for controlling the temperature of a body comprising:

a temperature measuring device for measuring the temperature of said body;

a controller for controlling a heating device which heats said body, said controller having a controller integral time constant and a controller gain constant; and an adjustment mechanism for determining said controller integral time constant and said controller gain constant wherein said controller integral time constant and said controller gain constant are determined utilizing the difference between said present temperature of said body and a desired temperature of said body.

10. A semiconductor processing apparatus comprising:

a plurality of lamps;

a pyrometer for measuring a current temperature of a susceptor located within said processing apparatus;

a controller for controlling the amount of power supplied to said plurality of lamps wherein said controller performs the steps of:

measuring a current temperature of said susceptor;

determining the difference between said current temperature of said susceptor and a desired temperature of said susceptor;

determining a controller integral time constant and a controller gain constant wherein said controller integral time constant and said controller gain constant depend upon said present temperature of said susceptor and said desired temperature of said susceptor;

determining an amount of power to be applied to said plurality of lamps based on said controller integral time constant and said controller gain constant; and providing said amount of power to said plurality of lamps.

11. The semiconductor processing apparatus of claim 10 wherein determining step of said new amount of power is determined utilizing a proportional integral derivative (PID) algorithm.

12. The semiconductor processing apparatus of claim 11 wherein said controller performs said plurality of steps a plurality of time.

13. The semiconductor processing apparatus of claim 12 wherein said plurality steps are repeated at least once every tenth second.

* * * * *